Feb. 10, 1942.                J. A. KELLY                 2,272,343
                       MANUFACTURE OF RUBBER TUBING
                         Filed May 3, 1940          7 Sheets-Sheet 1

Inventor
John A. Kelly
By Nathaniel Fruchs
    Attorney

Feb. 10, 1942.   J. A. KELLY   2,272,343
MANUFACTURE OF RUBBER TUBING
Filed May 3, 1940   7 Sheets-Sheet 2
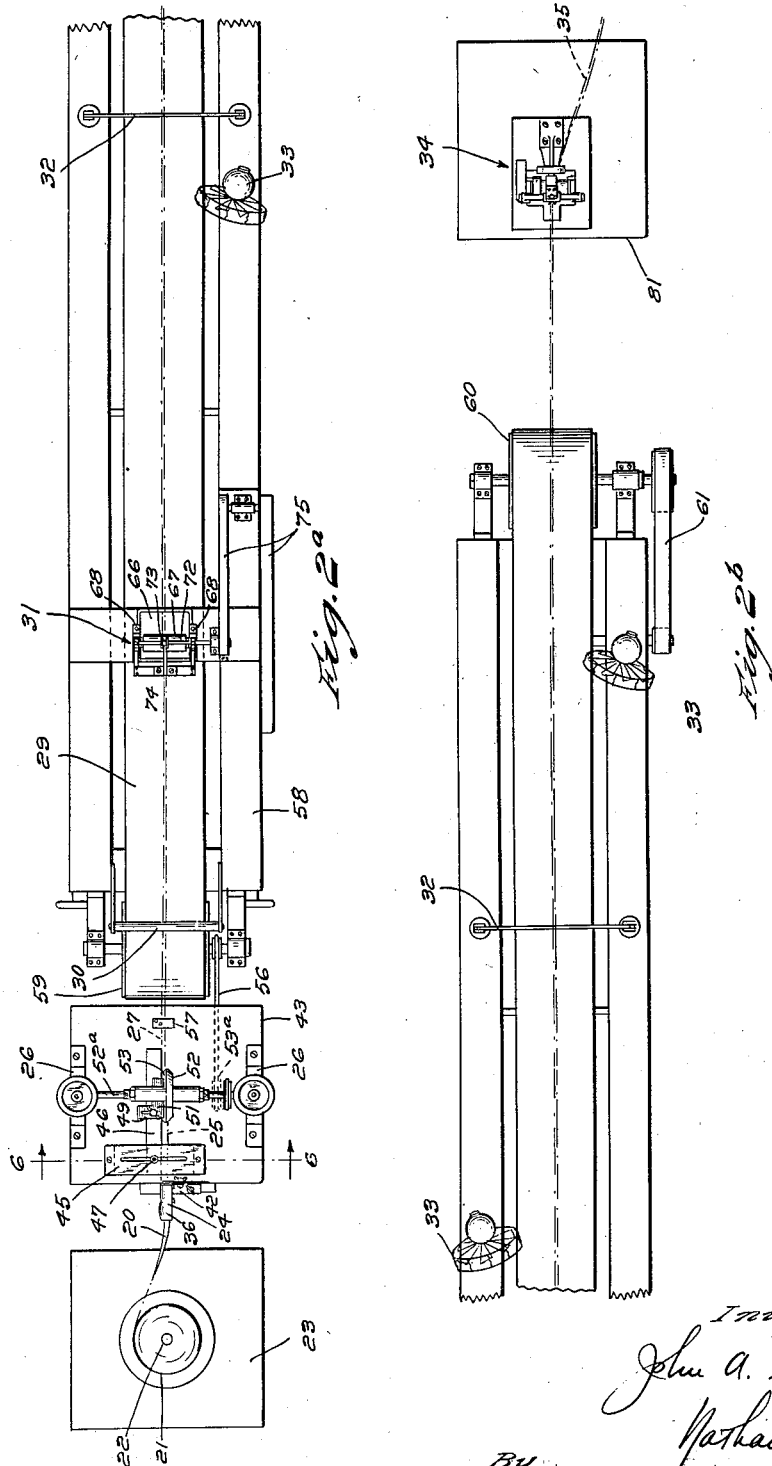

Feb. 10, 1942.                J. A. KELLY                2,272,343
                     MANUFACTURE OF RUBBER TUBING
                         Filed May 3, 1940              7 Sheets-Sheet 3

Inventor
John A. Kelly
By Nathaniel Frucht
Attorney

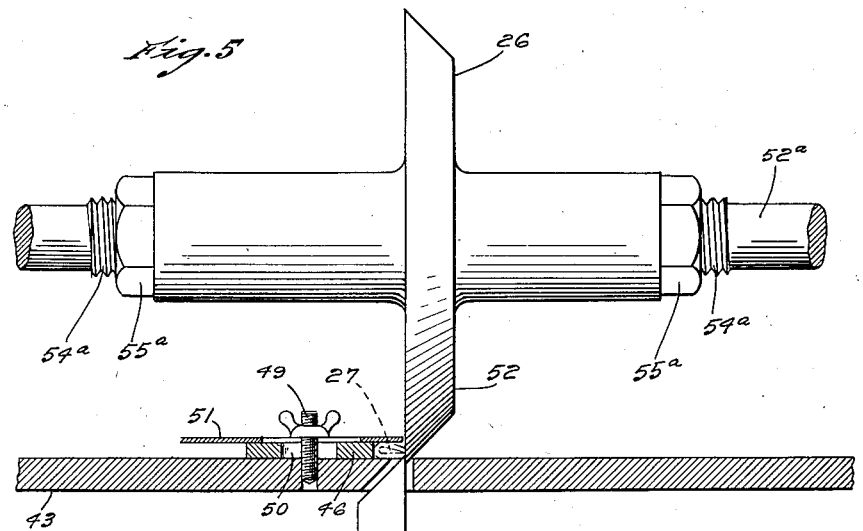
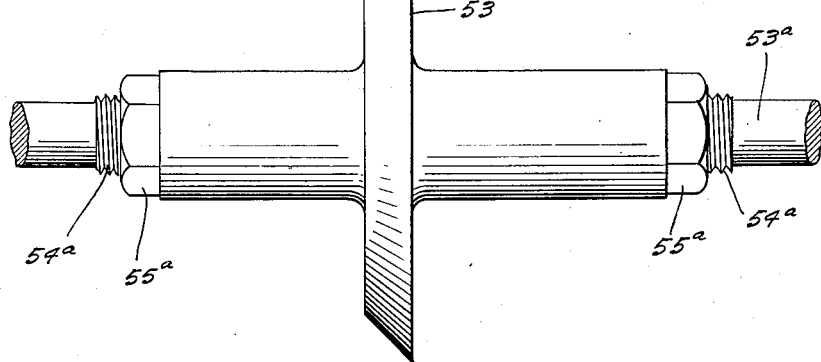
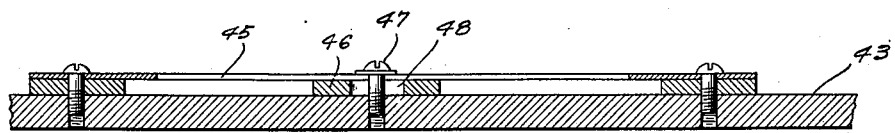

Feb. 10, 1942.   J. A. KELLY   2,272,343
MANUFACTURE OF RUBBER TUBING
Filed May 3, 1940   7 Sheets-Sheet 5
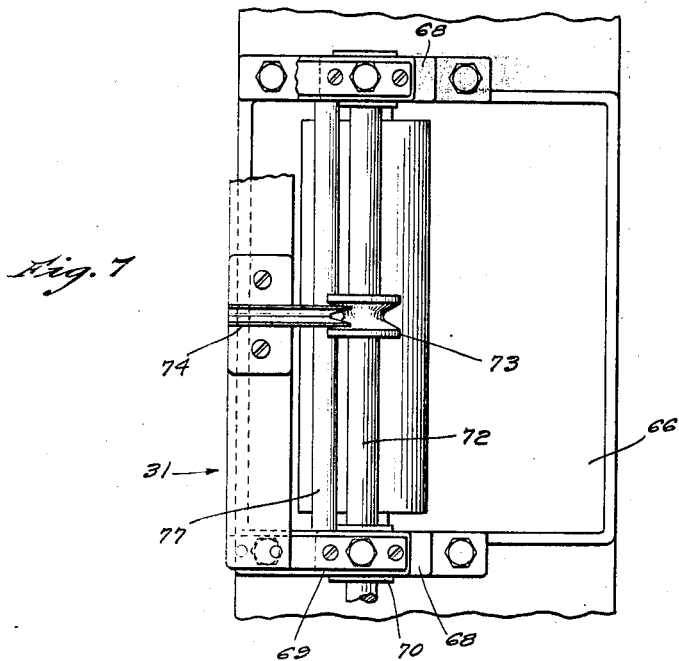
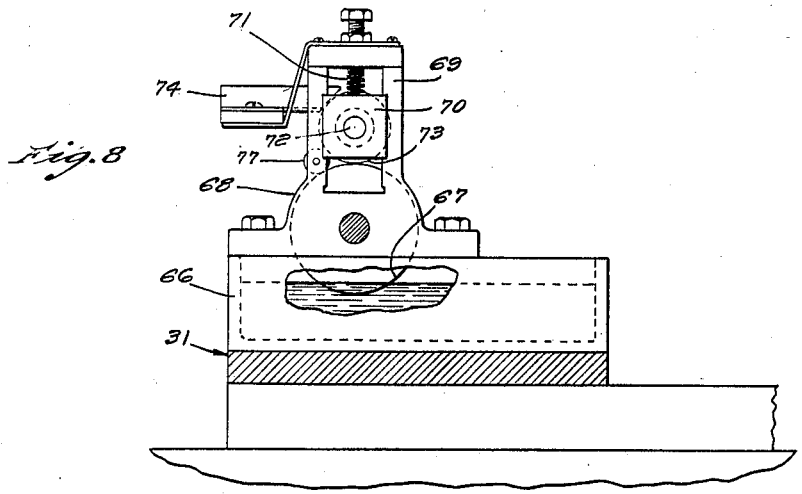
Inventor
John A. Kelly
By Nathaniel Frank
Attorney

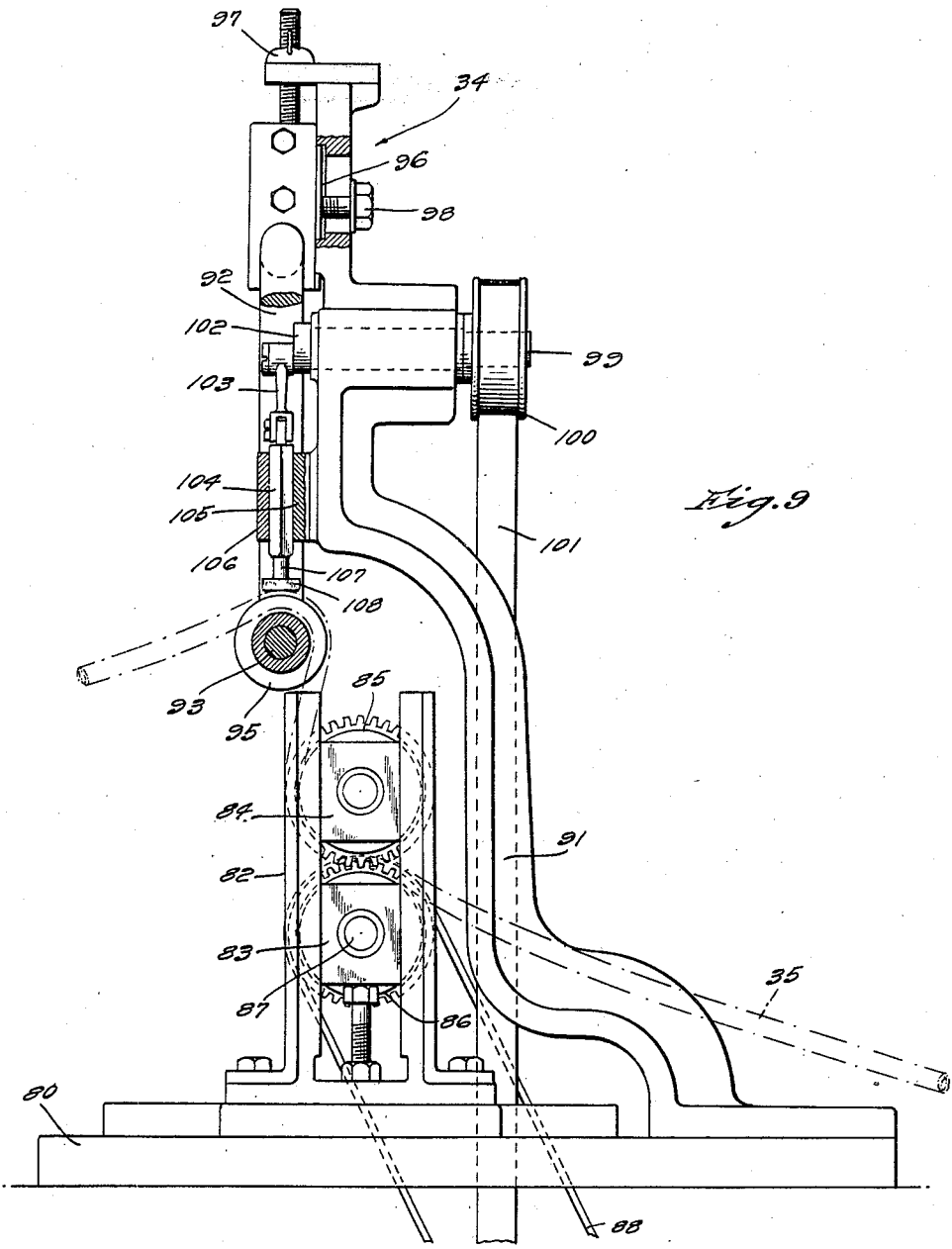

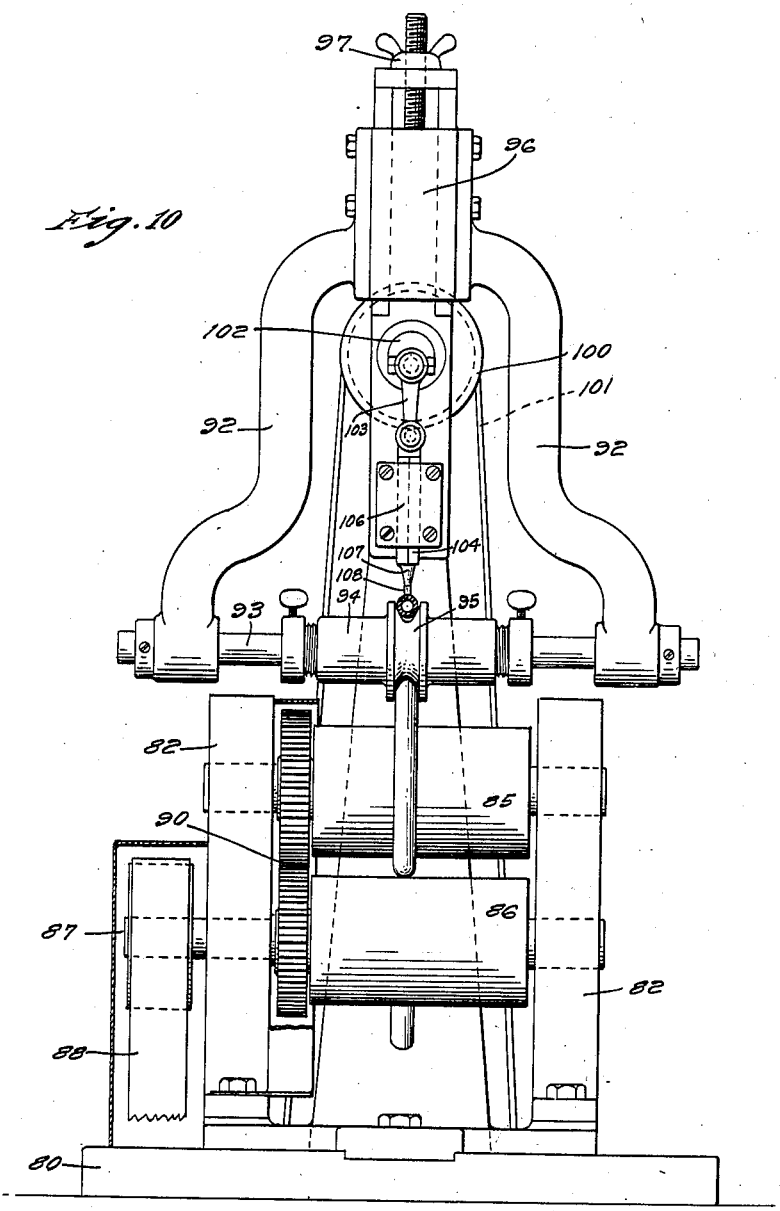

Patented Feb. 10, 1942

2,272,343

UNITED STATES PATENT OFFICE 2,272,343

MANUFACTURE OF RUBBER TUBING

John A. Kelly, Riverside, R. I., assignor to Davol Rubber Company, a corporation of Rhode Island Application May 3, 1940, Serial No. 333,134

8 Claims. (Cl. 154—8)

My present invention relates to the manufacture of rubber tubing and more particularly to a novel apparatus and a novel method for the manufacture of rubber tubing in continuous lengths.

The principal object of the present invention is to provide a novel method and apparatus for manufacturing rubber tubing in a continuous operation to provide rubber tubing of unlimited length.

A further object of the present invention is to provide an apparatus which is easy and economical to manufacture and assemble and which is readily adaptable for the manufacture of rubber tubing of various sizes and diameters.

With the above and other objects and advantageous features in view, my invention consists of a novel arrangement of parts and a novel method of manufacture, more fully disclosed in the detailed description following, in conjunction with the accompanying drawings, and more specifically defined in the claims appended thereto.

In the drawings:

Fig. 2a is a top plan view of a portion of the apparatus;

Fig. 2b is a similar view of the remaining portion;

Fig. 5 is an enlarged fragmentary view of the shearing knives;

Fig. 6 is a section taken along line 6—6 on Fig. 2a;

Fig. 7 is a plan view of the cement applying unit;

Fig. 8 is a side elevation of the same;

Fig. 9 is a side elevation of the joining unit;

Fig. 10 is a front elevation of the same;

Figure 1A:
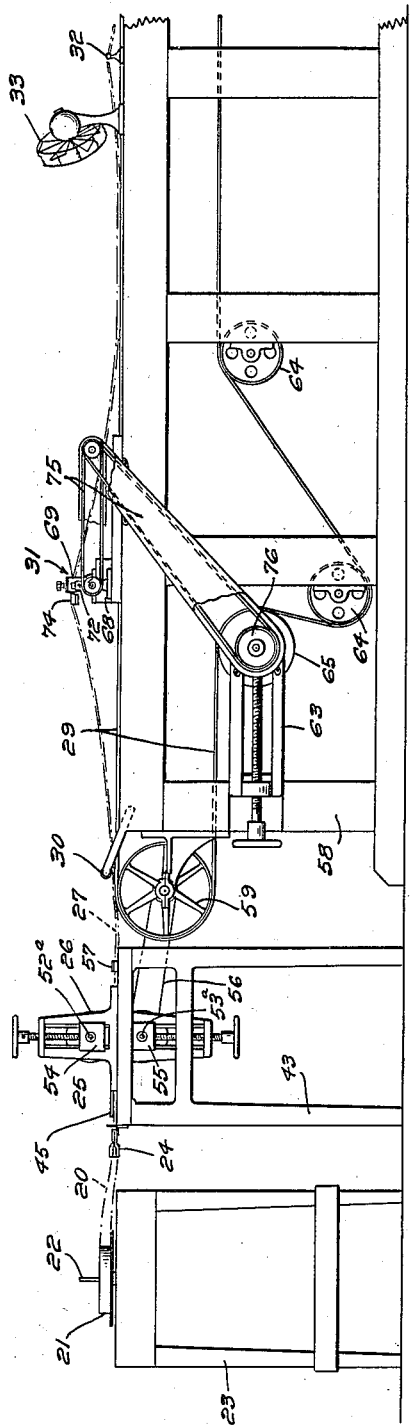
Fig. 1a is a side elevation of a portion of the apparatus embodying my invention.
Figure 1B:
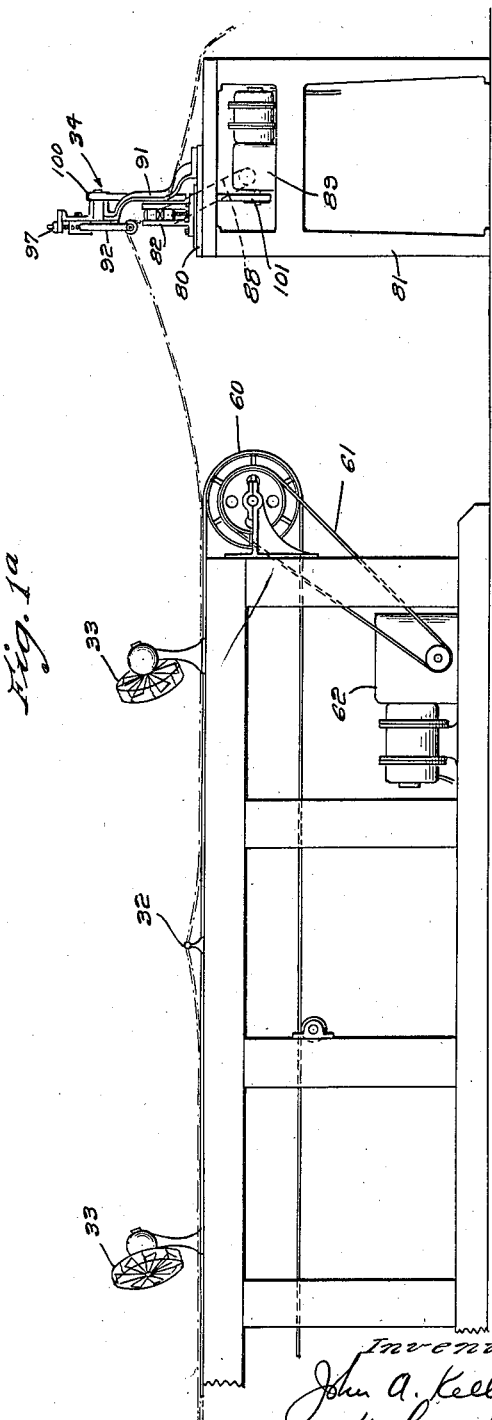
Fig. 1b is a similar view of the remaining portion of the same.
Figure 11:
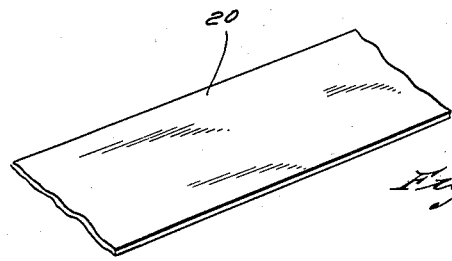
Fig. 11 is a perspective view of a segment of raw rubber prior to its entry into the apparatus.
Figure 12:
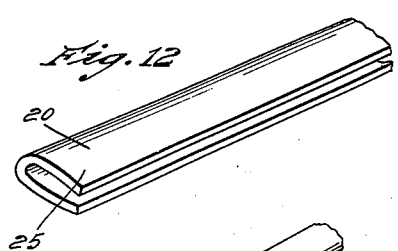
Fig. 12 is a perspective view of the rubber after passing through the folding device shown in Fig. 3.
Figure 13:
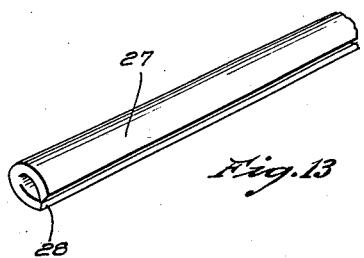
Fig. 13 is a perspective view of the rubber after passing through the shearing knives shown in Fig. 5.

Referring more in detail to the drawings embodying my invention, a ribbon of raw masticated rubber 20, shown in Fig. 11, is provided in a predetermined width slightly greater than the circumference of the desired finished tube, and is coiled on an annular plate or turn table 21 which is set onto a pin 22 on a suitable stand or table 23 as shown in Fig. 1. From the table 23 the ribbon or strip 20 passes into a folding unit 24 which folds it into the shape shown in Fig. 12, forming a U-shaped continuous ribbon or strip of rubber 25. The strip 25 now passes between the cutting knives 26 which shear and trim the edges to form the unfinished tube 27 shown in Fig. 13; the tube 27 having just sufficient rubber remaining therein to form the completed tubing of desired predetermined diameter.

The tubing 27, being of raw rubber, adheres at the edges 28 after passing between the shearing knives. The continuous tubing 27 now passes onto a conveyor belt 29, under the idler roller 30, and into the cementing unit 31, which places a coating of liquid cement along the edges 28. The tubing 27 is then carried along on the conveyor belt 29 a sufficient distance to permit partial drying of the cement until it becomes tacky. The drying is facilitated by lifting the tubing over spaced rods 32 to permit airing of the underside of the tubing and by fans 33 placed at spaced intervals along the path of movement to accomplish a partial drying of the cement.

Figure 14:
Fig. 14 is a perspective view of the finished tube after leaving the joining device shown in Figs. 9 and 10.

The tubing 27 then passes off the conveyor belt 29 and into the joining unit 34 which hammers and irons the edges 28 together to form the finished tubing 35 shown in Fig. 14. The completed tubing 35 can then be vulcanized in any well-known manner.

By the method heretofore described, the raw rubber is formed into an endless seamless tubing in a continuous unbroken operation. The tubing may be sheared to any desired diameter and the original sheet stock may be rolled to any desired thickness for forming tubing for transfusion tubes, stethoscopes, and the like. The apparatus for carrying out the method is described herein for illustrative purposes only as any other suitable apparatus may be used. In the preferred apparatus, the operation is continuous with the raw rubber moving in at one end and passing out as a completed tube, ready for vulcanizing, at the other end.

Referring more in detail to the illustrative apparatus, the raw rubber 20 is coiled on a plate or turn table 21 which is rotatably mounted on a pivot pin 22 on a stand 23 which may be of any desired size or shape. As the rubber on the plate 21 is used up, a second similar plate may be placed ready for use with the end of the coil thereon joined to the end of the rubber on the first plate by hammering the ends together. Inasmuch as the rubber is in a raw masticated state, the joinder will leave no seam in the finished product and the operation can be continuous to any desired length.

Figure 3:
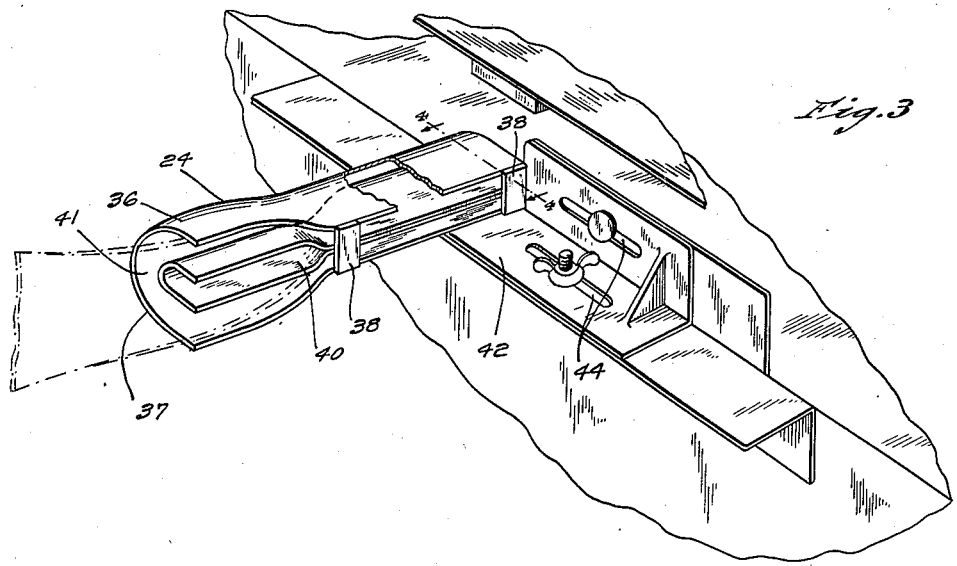
Fig. 3 is a perspective view of the folding unit.
Figure 4:
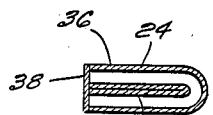
Fig. 4 is a section taken along line 4—4 on Fig. 3.

The ribbon of rubber 20 then passes into the folding unit 24 shown in detail in Fig. 3. The folding unit 24 may be stamped from sheet stock and comprises an outer generally U-shaped shell 36 which is flared at one end 37 to form a funnel shape, the edges being joined together by suitable spacing cross pieces 38. Spaced from the outer shell 36 is an inner intermediate portion 39 which is folded into a thin plate at one end and flares outwardly, as at 40, at the other end, into the flared end 37 of the outer shell to form a U-shaped channel 41 between the parts 36 and 39 through which the rubber passes. As the rubber 20 passes through the U-shaped channel 41 it is folded over into the form 25 shown in Fig. 12. The unit 24 may be soldered to a stand or plate 42 which is adjustably mounted on the edge of a table 43 as by the slot and screw arrangement 44. The size of the unit 24 may be varied, depending on the desired diameter of the finished tubing, and different sized units may be provided as desired and readjusted at the edge of the table 43.

Referring to Fig. 6, the tubing 25 now passes beneath a guide plate 45 and between the shearing knives 26. The guide plate 45 serves to keep the tubing 25 in folded relation and the tubing 25 is guided along the edge of a guide 46 which is laterally adjustable for different widths of tubing by means of the screw 47 and slot 48. The end of the guide 46 adjacent the shearing knives is similarly adjustable by means of the screw 49 and slots 50. Mounted across the top of the guide adjacent the shearing knives is a pressure plate 51 which is adjustably mounted by means of the screw 49 and adapted to press the tubing 25 into position for shearing between the knives as shown in Fig. 5. The shearing knives 26 comprise two rotary cutters 52 and 53 mounted on shafts 52a and 53a and rotating in opposite direction. The shafts 42a and 53a are journalled in adjustable journal blocks 54 and 55 which are adjustably mounted, as shown in Fig. 1a, to permit vertical adjustment of the cutting edges. The knives 52 and 53 may also be laterally adjusted and centered on each shaft by means of threads 54a and bolts 55a. The shafts 52a and 53a may be driven by any conventional means, the illustrated means being a belt arrangement 56 connecting the shaft with the conveyor drive.

Since the tubing 25 is of raw, masticated and unvulcanized rubber, the edges 28 will adhere as they pass between the cutters 52 and 53. The tubing then passes beneath a guide plate 57 and onto the conveyor belt 29. The belt 29 is mounted on an elongated table 58 provided at each end with the usual pulleys 59 and 60, the pulley 60 being driven through a belt 61 and gear box and motor arrangement 62. The tension of the belt is adjustable through the adjusting unit 63 which may be of any conventional type; the illustrated type comprising a pair of idler rollers 64 adapted to turn the belt into a loop and an adjustable idler roller 65 adapted to be adjustably pushed into the looped portion of the belt. As the tubing 27 passes onto the belt 29 and beneath the roller 30 it is carried into the cement applying unit 31 which straddles the belt 29.

The cement applying unit 31 comprises a tank 66 which holds liquid cement and upon which is mounted a roller 67, the lower side of which passes beneath the surface of the cement in the tank. The roller 67 is journalled in a guide plate 68 having an integral upper frame 69 in which journal blocks 70 are vertically slidably mounted, and urged downwardly by an adjustable spring 71. A shaft 72 is journalled in the blocks 70 and carries a grooved pulley 73 in the central portion thereof. The tubing 28 passes into a guide channel 74 mounted in the forward part of the cementing unit, the guide channel 74 being adapted to turn the tubing 27 through an angle of 90° so that the sheared edges 28 are turned downwardly. The roller 67 may be driven through the belting arrangement 75 connected through a pulley 76 attached to the idler roller 65 of the belt adjustor.

After the tubing 27 passes through the channel 74 with the sheared edges 28 extending downwardly, it passes into the grooved pulley 73. Since the grooved pulley 73 is held in contact with the roller 67 by the action of the spring 71, it picks up liquid cement from the surface thereof and applies it to the edges and surface of the tubing 27. The excess cement on the roller 67 may be removed by an idler roller 77 mounted in the frame 69. To insure a proper application of cement, it is preferred that the cement be in a fluid state so that it will run easily into the groove of the pulley 73.

As the tubing 27 is carried along by the conveyor belt 29, it is fanned at intervals by the fans 33 which partially dry the cement and render it tacky. At spaced intervals the tubing passes over the rods 32 so that the air can circulate under the tubing, assist in the drying operation, and prevent it from sticking to the belt 29.

The tubing now passes off the end of the belt 29 and into the joining unit 34 illustrated in detail in Figs. 9 and 10. The unit 34 includes a base 80 which may be suitably mounted on a table 81. Mounted on the forward end of the base 80 is a U-shaped standard 82 in which are vertically slidably mounted journal blocks 83 and 84 carrying spaced rollers 85 and 86. The lower roller 86 may be driven through a shaft 87, belt 88 and motor 89; the rollers 85 and 86 being geared to each other, as at 90, to provide a drive in opposite direction. Mounted at the rear of the base 80 is a standard 91 which is curved forwardly and upwardly so that it terminates above the rollers 85 and 86. Clamped to each side of the end of the standard 91 are a pair of arms 92 which form an inverted U-shaped depending yoke having a horizontal shaft 93 journalled between its ends. Removably mounted on the shaft 93 is a collar 94 having an integral grooved pulley portion 95 which may be changed for different diameters of tubing. The arms 92 forming the yoke are bolted to a block 96 in the upper end of the standard 91 which is mounted for vertical adjustment as by means of the adjustment screw 97 and set screw 98.

A shaft 99 is mounted transversely through the top of the standard 91, the rear end of the shaft being driven through the pulley 100 and belt 101 by the motor 89. The forward end of the shaft is provided with an eccentric 102 and link 103 pivoted to a vertical ram 104. The ram 104 is vertically slidable in a bearing 105 covered by a plate 106. The ram 104 and the bearing 105 may be of non-circular cross section to prevent twisting. The lower head of the ram 104 is tapered as at 107 and terminates in an inverted T-shape hammer head 108 of narrow rectangular cross section and positioned in alignment with the path of movement of the tubing 27.

As the tubing 27 passes over the groove pulley 95 the sheared edge 28 passes beneath the hammer head 108 and around and between the rollers 85 and 86, which rotate at a comparatively slow speed synchronously with the speed of movement of the conveyor belt 29. The hammer head 108 reciprocates rapidly, preferably at very high speed, and hammers the sheared edges 28 bearing the tacky cement into joined abutting relation, the length of the hammer 108 and the speed of movement being such that every point along the edge 28 will come in contact with a portion of the hammer head. Simultaneously with the hammering action of the head 108, an ironing action is provided in view of the fact that as the head 108 comes in contact with the edge 28 of the tubing, the movement of the tubing due to the pulling action of the rollers 85 and 86 will cause a rubbing or ironing of the head 108, which joins the abutting edges and smooths the tubing seam. This also tends to push the tubing into the annular cross section of the finished tube 35 illustrated in Fig. 14. To insure a proper feed of the edges 28 under the hammer 108, it may be necessary to manually twist and guide the tubing into the pulley 95.

The tubing 35 may be received in a suitable container or wound on spools and vulcanized into its final form.

The adjustment of the yoke 92 controls the distance between the tubing and the hammer head 108 so that the force and length of the stroke may be adjusted for different diameters of tubing.

While I have described a specific constructional embodiment of my invention and a specific method, it is obvious that changes in the method and apparatus may be made to suit the requirements for different tubing constructions and materials, without departing from the spirit and the scope of the invention as defined in the appended claims.

I claim:

1. The method of manufacturing rubber tubing in continuous lengths comprising the steps of forming unvulcanized rubber into a ribbon of greater width than the circumference of the desired tubing and of sufficient thickness to form a self-supporting wall when shaped into a tube, folding the ribbon, shearing the excess rubber at the contiguous free edges and simultaneously causing said free edges to adhere to each other, joining the edges by the application of pressure and simultaneously moving the tubing under pressure to cause an ironing effect, and vulcanizing the resultant tubing.

2. The method of manufacturing rubber tubing in continuous lengths comprising the steps of forming unvulcanized rubber into a ribbon of greater width than the circumference of the desired tubing, folding the ribbon, shearing the excess rubber at the contiguous free edges and simultaneously causing said free edges to adhere to each other, applying adhesive to said edges, subjecting said free edges to directed air currents to partially dry the adhesive, joining the edges by the application of pressure and simultaneously moving the tubing under pressure to cause an ironing effect, and vulcanizing the resultant tubing.

3. In combination, a continuous source of supply of unvulcanized rubber in ribbon form, means for folding said rubber ribbon, means for applying adhesive to the edges of said ribbon, and means for applying pressure to the contiguous edges of said folded ribbon to form a tube, said adhesive applying means comprising a tank containing the adhesive, a cylinder extending partially into said tank, a grooved pulley rotatably mounted in contact with said cylinder, and means for turning said rubber ribbon to pass its free edges through said pulley.

4. In combination, a continuous source of supply of unvulcanized rubber in ribbon form, means for folding said rubber ribbon, means for applying adhesive to the edges of said rubber, means for partially drying said adhesive, and means for applying pressure to the contiguous edges of said folded ribbon to form a tube, said drying means including an endless belt for carrying said rubber ribbon at a predetermined rate of speed, means for directing air currents at said rubber ribbon, and means for lifting said rubber ribbon from said belt to permit the air currents to pass thereunder.

5. In combination, a continuous source of supply of unvulcanized rubber in ribbon form, means for folding said rubber ribbon, means for shearing excess rubber from the contiguous edges of said ribbon, means for applying adhesive to the edges of said ribbon, means for partially drying said adhesive, and means for applying pressure to the contiguous edges of said folded ribbon to form a tube, said shearing means comprising a pair of rotary cutters mounted with their cutting faces in opposed aligned relationship, said drying means including an endless belt for carrying said rubber ribbon at a predetermined rate of speed, means for directing air currents at said rubber ribbon, and means for lifting said rubber ribbon from said belt to permit the air currents to pass thereunder.

6. In combination, a source of supply of unvulcanized rubber in ribbon form of sufficient thickness to form a self-supporting wall when shaped into a tube, means for folding said rubber, means for shearing excess rubber from the longitudinal edges of said folded ribbon, means for applying adhesive to the sheared edges of said rubber, means for applying pressure to the contiguous longitudinal edges of said rubber to join the same into a tube, means for continuously moving said rubber ribbon from said source of supply through said folding, shearing and adhesive applying means at a predetermined rate of speed, and means for pulling said rubber ribbon through said pressure applying means at the same predetermined speed.

7. In combination, a source of supply of unvulcanized rubber in ribbon form, means for folding said rubber, means for shearing excess rubber from the longitudinal free edges of said folded ribbon, means for applying adhesive to the sheared edges of said rubber, means for partially drying said adhesive, means for hammering the edges together to join said ribbon into a tube, and means for continuously moving said ribbon through said hammering means to produce a pressure applying and ironing effect, said hammering means comprising a grooved pulley, a hammer reciprocable over the groove in said pulley and means for continuously pulling said rubber ribbon over said grooved pulley during the reciprocation of said hammer and in timed sequence thereto, whereby every portion of the seam in said rubber ribbon will receive a stroke of said hammer and an ironing action at the end of each stroke.

8. In combination, a source of supply of unvulcanized rubber in ribbon form, means for folding said rubber, means for shearing excess rubber from the longitudinal free elges of said folded ribbon, means for applying adhesive to the sheared edges of said rubber, means for partially drying said adhesive, means for hammering the edges together to join said ribbon into a tube, and means for continuously moving said ribbon through said folding, shearing, adhesive applying, drying, and through said hammering means to produce a pressure applying and ironing effect, said shearing means including a pair of rotary cutters having their cutting faces in opposed aligned relationships and their cutting edges overlapping, and adjustable means for guiding said rubber ribbon between said rotary cutters.

JOHN A. KELLY.